(No Model.) 2 Sheets—Sheet 1.

P. AYRES.
FRESH AIR INLET FOR SANITARY VENTILATION.

No. 589,923. Patented Sept. 14, 1897.

WITNESSES:-

INVENTOR.

(No Model.) 2 Sheets—Sheet 2.

P. AYRES.
FRESH AIR INLET FOR SANITARY VENTILATION.

No. 589,923. Patented Sept. 14, 1897.

WITNESSES:—
Herbert H. Steele
Stephen Donovan

INVENTOR
Paul Ayres

UNITED STATES PATENT OFFICE.

PAUL AYRES, OF ROCKVILLE CENTRE, NEW YORK.

FRESH-AIR INLET FOR SANITARY VENTILATION.

SPECIFICATION forming part of Letters Patent No. 589,923, dated September 14, 1897.

Application filed October 1, 1895. Serial No. 564,330. (No model.)

*To all whom it may concern:*

Be it known that I, PAUL AYRES, a citizen of the United States, and a resident of Rockville Centre, in the county of Queens and State of New York, have invented certain new and useful Improvements in Fresh-Air Inlets for Sanitary Ventilation, of which the following is a specification.

My invention relates to that class of fresh-air inlets for sanitary ventilation in which a water and air tight valve operates to close and open automatically for purposes of ventilating the entire sanitary or plumbing system of the house; and the objects of my invention are, first, to provide a valve having an adjustable counterbalancing mechanism (that shall be protected from injury by falling bodies externally and from any accumulation of refuse internally) designed to close the valve automatically at the slightest pressure in the soil-pipe caused by the flushing of a tank, &c., thus preventing the escape of any noxious odors or gases, and to open again when the said pressure shall have become normal; second, to provide a mechanism that can be attached to any house drain, sewer, or soil pipe between the intercepting-trap and all house connections; third, to do away with the fresh-air inlet-pipe now in vogue running from the trap to the curb and terminating in a grated receptacle, and, fourth, to so construct a fresh-air inlet that it may be readily removed without injury for inspection or repair. I attain or accomplish these objects by the mechanism illustrated in the accompanying drawings, in which—

Figure 1:
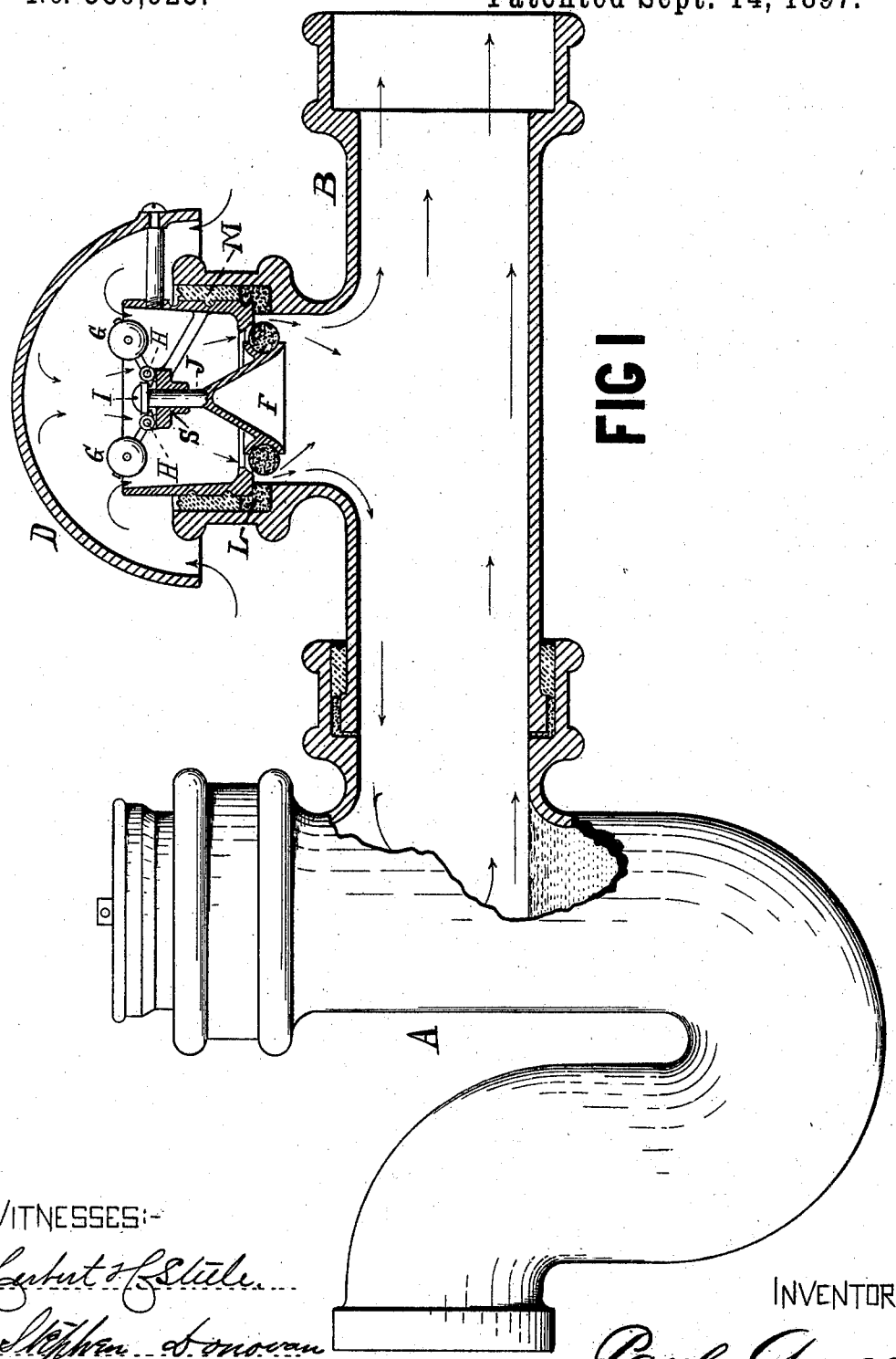
Figure 2:
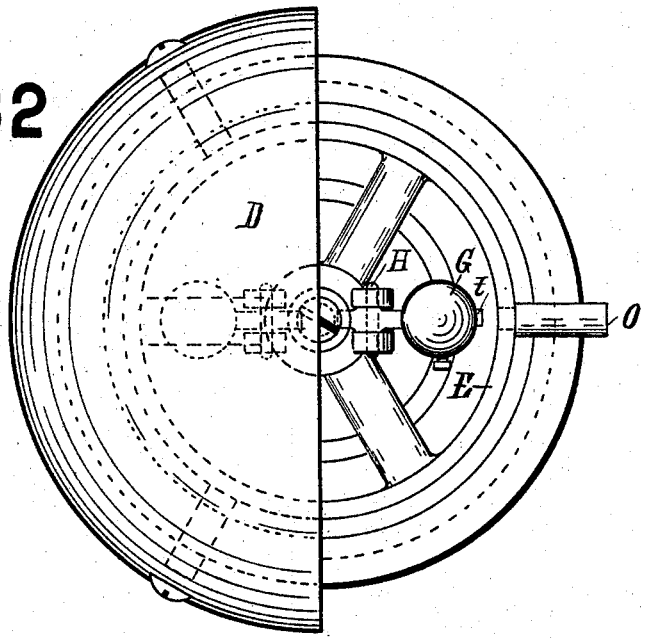
Figure 3:
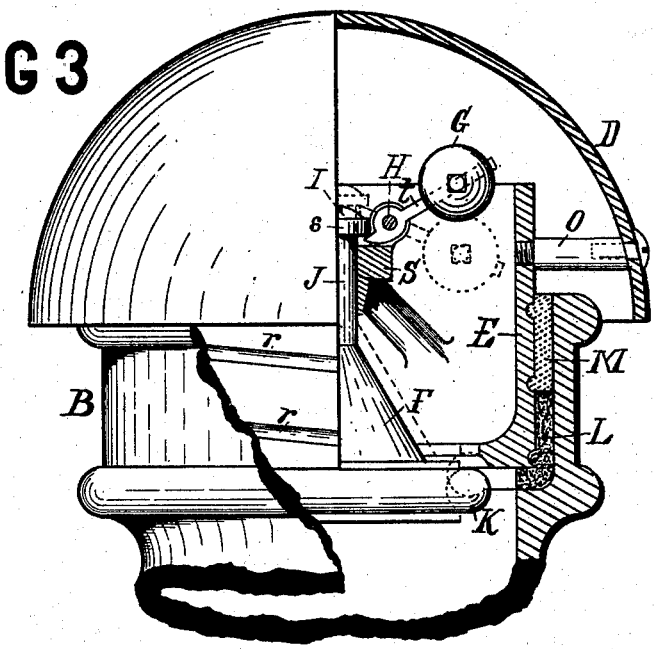

Figure 1 is a sectional view of the apparatus, showing its connection with the T and its relations with the sewer-trap A according to my invention. Fig. 2 is a top or plan view showing a portion of the hood cut away to better illustrate the valve-operating mechanism; and Fig. 3 a vertical cross-sectional view, and will be hereinafter more fully described.

Referring now to Fig. 1, the trap A and T B are of standard make. The mechanism according to my invention consists of a circular shell or sleeve E, whose outside diameter is sufficiently smaller than the inner diameter of the hub of the T to allow of its being packed and leaded in the ordinary way, rendering the joint air and water tight. The outer periphery of this sleeve E is turned smooth and true and has a quick-acting double thread or spiral groove *r r* cut its entire length to insure the said sleeve from being forced out of its proper position by any internal pressure in the pipes and at the same time to provide a ready means of removing the entire fixture for inspection or repair, as the spiral grooves referred to serve as a screw and the lead joint as a nut. Near the top edge of the sleeve are three tapped holes to receive as many studs or posts O. These posts serve the double purpose of giving support to the hood D and serving as a wrench when it is desirable to remove the sleeve from the T. The lower inside edge of the sleeve or shell furnishes the seat for the valve, and midway up the inside are three arms extending toward and joining at the center to form a hub, through which the valve-stem J passes freely.

The stem flares at the bottom and terminates in a groove, into which a solid-rubber packing-ring K is sprung, which forms an airtight joint with the valve-seat with comparatively little pressure. Instead of using a flexible valve a metal cone-valve can be used with nearly as good results, in which case the said seat will be much narrower—in fact, almost a knife-edge. The valve F is made cone-shaped to make it more sensitive to any internal pressure, as it allows a greater surface to be acted upon. The upper end of the valve-stem is provided with a washer *s* and a screw I to hold the latter in position.

Extending upward from the hub S and diametrically opposite each other are two pairs of ears, between which are fulcrumed at H two levers. The short toe of each toward the valve-stem engages the washer *s*. The other or longer ends are provided with a sliding adjustable weight having a set-screw. These two weights combined should very nearly place the valve in a state of equilibrium—that is, the valve should overbalance the weights just enough to allow it to separate from its seat when the internal pressure has become normal. In an emergency, where old work is being repaired or no T is available, a hole is cut through the top side of the pipe near the trap, a saddle-hub bolted on, and the fixture attached to the so-formed T, as described above, and also where there is an incline or pitch to the pipe the shell or sleeve must be tilted to bring it into horizontal position, if possible.

The operation of my invention as now described is simple and requires little explanation. The shell or sleeve having been placed properly in the T or saddle-hub, the weights are adjusted and the hood placed in position. The entire apparatus being placed in the cellar is free from snow, ice, and dirt. There being no pressure in the soil-pipe, the valve remains open, thus allowing the fresh air to circulate through it, as shown by arrows, and through the entire house system and carrying all odors and foul gases up the vent-pipes through the roof. In the event of the flushing of a tank, &c., the water in rushing down the soil-pipe forces the air before it, which, meeting a resistance of the water in the trap, generates a pressure, causing the valve to close and preventing the back pressure of gas or water into the cellar and either forcing the remaining air through the trap into the sewer or up the vents to the roof. When this pressure in the pipes has exhausted itself or become normal, the valve opens and a new supply of fresh air circulates through the system.

Should the valve at any time require a new packing-ring or any disarrangement of the parts exist necessitating the removal of the shell, the hood is taken off and the shell unscrewed from the hub.

Having now described the nature of my invention, I wish it understood that I do not limit myself to the precise construction and arrangement of parts as shown in my drawings, but may vary the same in any manner to better carry out the principle of my invention without departing from the true scope thereof.

What I claim, and desire to secure by Letters Patent, is—

1. In a fresh-air inlet for sanitary ventilation, the combination of a sewer or drain pipe T or a saddle-hub with a cylindrical shell E, lead-jointed to said hub or T, and having a valve-seat at the inner end; a valve F, engaging said seat, packing-ring K and valve-stem J thereon, and screw I in said stem; equilibrium-levers $t, t$, engaging said stem and adjustable weights G, G, on said levers substantially as set forth.

2. In a fresh-air inlet for sanitary ventilation, the combination of a sewer or drain pipe T or a saddle-hub, with a cylindrical shell E lead-jointed to said T or saddle-hub; said shell being provided with spiral grooves $r, r$, a hood D over said shell and two or more studs or posts $o, o, o$, for supporting said hood; a valve F, packing-ring K and valve-stem J thereon, and screw I in said stem; equilibrium-levers $t, t$, engaging said stem and adjustable weights, G, G, on said levers substantially as described.

3. In a fresh-air inlet for sanitary ventilation, the combination of a sewer or drain pipe, an inlet thereto provided with a valve-seat, a valve therefor having a stem provided with an annular shoulder, levers pivoted adjacent to said valve, one end of each of which engages said shoulder; adjustable weights attached to the opposite ends of said levers, said weights being adjusted so that they will overbalance and close said valve, substantially as described.

In testimony that I claim the foregoing as my invention I have signed my name, in presence of two witnesses, this 28th day of September, 1895.

PAUL AYRES.

Witnesses:
M. PARTINGTON,
HUBERT H. STEELE.